US008494543B2

(12) United States Patent
Koodli et al.

(10) Patent No.: US 8,494,543 B2
(45) Date of Patent: Jul. 23, 2013

(54) FLOW BALANCING IN COMMUNICATIONS NETWORKS

(75) Inventors: Rajeev Koodli, Sunnyvale, CA (US); Kuntal Chowdhury, Andover, MA (US)

(73) Assignee: Cisco Technology, Inc., San Jose, CA (US)

(*) Notice: Subject to any disclaimer, the term of this patent is extended or adjusted under 35 U.S.C. 154(b) by 379 days.

(21) Appl. No.: 12/579,166

(22) Filed: Oct. 14, 2009

(65) Prior Publication Data

US 2010/0091653 A1 Apr. 15, 2010

Related U.S. Application Data

(60) Provisional application No. 61/105,242, filed on Oct. 14, 2008.

(51) Int. Cl.
| | |
|---|---|
| *H04W 72/00* | (2009.01) |
| *H04W 36/00* | (2009.01) |
| *H04J 1/00* | (2006.01) |
| H04W 4/00 | (2009.01) |
| G06F 15/16 | (2006.01) |

(52) U.S. Cl.
USPC ........... 455/453; 370/231; 370/331; 455/439; 455/442; 709/232; 709/239; 709/240

(58) Field of Classification Search
USPC ................. 370/235, 328, 329, 331, 335, 469, 370/231, 236, 322, 341; 709/221, 232, 239, 709/240; 455/437, 438, 439, 442, 452.1, 455/453
See application file for complete search history.

(56) References Cited

U.S. PATENT DOCUMENTS

| | | | | |
|---|---|---|---|---|
| 2009/0094693 | A1* | 4/2009 | Patil | 726/12 |
| 2010/0027509 | A1* | 2/2010 | Velev et al. | 370/331 |
| 2010/0067446 | A1* | 3/2010 | Oulai et al. | 370/329 |
| 2010/0254347 | A1* | 10/2010 | Muhanna et al. | 370/331 |
| 2010/0296481 | A1* | 11/2010 | Weniger et al. | 370/331 |
| 2010/0309846 | A1* | 12/2010 | Rune | 370/328 |
| 2011/0153792 | A1* | 6/2011 | Bachmann et al. | 709/221 |
| 2011/0191494 | A1* | 8/2011 | Turanyi et al. | 709/242 |

OTHER PUBLICATIONS

Internet Engineering Task Force (IETF) "A Filter Rule Mechanism for Multi-access Mobile IPv6 draft-larsson-monami6-filter-rules-02" Mar. 5, 2007.*

(Continued)

*Primary Examiner* — Michael Thier
*Assistant Examiner* — Awet Haile
(74) *Attorney, Agent, or Firm* — Wilmer Cutler Pickering Hale and Dorr LLP

(57) ABSTRACT

Methods and systems are disclosed that provide flow balancing for multiple radio access technologies in a communication network. A mechanism is provided that enables the handover of one or more data flows when a mobile device is attached to more than one access technology at the same time. The handover can be initiated by the network or the subscriber and can be based on rules and/or policies known at the time. The mechanism can be implemented in a gateway device that provides communication between the packet core and the access network. The mechanism can also be used in providing handovers between access technologies such as a femtocell access network and an LTE access network.

20 Claims, 6 Drawing Sheets

OTHER PUBLICATIONS

3GPP TS 23.401 V8.3.0 (Sep. 2008), 3rd Generation Partnership Project; Technical Specification Group Services and System Aspects; General Packet Radio Services (GPRS) enhancements for Evolved Universal Terrestrial Radio Access Network (E-UTRAN) access (Release 8), http://www.3gpp.org.

Narten, T. et al., "Neighbor Discovery for IP version 6 (IPv6)," RFC 4861, Standard Track, Sep. 2007, pp. 1-30.

Gundavelli, E. et al., "Proxy Mobile IPv6," RFC 5213, Standard Tracks, Aug. 2008, pp. 1-93.

* cited by examiner

FLOW BALANCING IN COMMUNICATIONS NETWORKS

CROSS-REFERENCE TO RELATED APPLICATIONS

This application claims benefit under 35 U.S.C. §119(e) of U.S. Provisional Patent Application No.:61/105,242, entitled "Flow Balancing In Communication Networks," filed Oct. 14, 2008, which is hereby incorporated by reference herein in its entirety.

TECHNICAL FIELD OF THE DISCLOSURE

Methods and systems are disclosed that provide flow balancing for multiple radio access technologies in a communication network.

BACKGROUND OF THE DISCLOSURE

Wireless networks are telecommunications networks that use both wire and radio waves to carry information from one node in the network to a one or more receiving nodes in the network. Cellular telephony is characterized by the use of radio cells that provide radio coverage for a set geographic area, with multiple cells arranged to provide contiguous radio coverage. The first generation of wireless telephone technology were analog mobile phones and a couple of technologies were used to provide this first generation (1G) wireless service. As technology progressed a second generation (2G) of wireless service was introduced. The main difference between 1G systems and 2G systems were that radio signals in 1G networks were primarily analog, while 2G networks were digital. Second generation technologies were primarily based into time division multiplexed access (TDMA) and code division multiplexed access (CDMA). Networks that were upgraded to handle higher-speed data transfer are referred to as 2.5G and 3G networks. The 3rd Generation Partnership Project (3GPP) and the 3rd Generation Partnership Project 2 (3GPP2) respectively developed GSM/UMTS and cdmaOne/CDMA2000 technologies. The next evolution is 4G technology, which appears to be a version of Universal Mobile Telecommunications System (UMTS) that is based on long term evolution-system architecture evolution (LTE-SAE).

At the same time, other wireless access technologies have also developed such as wireless LAN (WiFi), which covers various IEEE 802.11 protocols, WiMAX, which covers IEEE 802.16, and HiperMAN, which is based on an ETSI alternative to IEEE 802.16. These other wireless access technologies are packet based wireless communication technologies developed for delivering packet based content over radio waves. Wireless communication technologies are used in connection with many applications, including, for example, satellite communications systems, portable digital assistants (PDAs), laptop computers, and mobile devices (e.g., cellular telephones, user equipment). One significant benefit that users of such applications obtain is the ability to connect to a network (e.g., the Internet) as long as the user is within range of such a wireless communication technology.

Current wireless communication systems use either, or a combination of, circuit switching and packet switching in order to provide mobile data services to mobile devices. Generally speaking, with circuit-based approaches, wireless data is carried by a dedicated (and uninterrupted) connection between the sender and recipient of data using a physical switching path. Once the direct connection is set-up, it is maintained for as long as the sender and receiver have data to exchange. The establishment of such a direct and dedicated switching path results in a fixed share of network resources being tied up until the connection is closed. When the physical connection between the sender and the receiver is no longer desired, it is torn-down and the network resources are allocated to other users as necessary.

Packet-based approaches, on the other hand, do not permanently assign transmission resources to a given call, and do not require the set-up and tear-down of physical connections between a sender and receiver of data. In general, a data flow in packet-based approaches is "packetized." That is, the data is divided into separate segments of information, and each segment receives "header" information that may provide, for example, source information, destination information, information regarding the number of bits in the packet, priority information, and security information. The packets are then routed to a destination independently, based on the header information. The data flow may include a number of packets or a single packet. As the progression of wireless access technologies has continued, mobile devices have developed so that more than one access technology can be used to connect to a telecommunication network.

SUMMARY

Methods and systems are disclosed that provide flow balancing for multiple radio access technologies in a communication network. A mechanism is provided that enables the handover of one or more data flows when a mobile device is attached to a plurality of access technologies at the same time. The handover can be initiated by the network or the mobile device and can be based on rules and/or policies known at the time. The mechanism can be implemented in a gateway device that provides communication between the packet core and the access network. The mechanism can also be used in providing handovers between access technologies such as a femtocell access network and an LTE access network.

In some embodiments, a gateway that implements a local mobility anchor is presented that includes a first network connection configured to send and receive data flows from a packet network, a second network connection configured to send and receive data flows from a user equipment, and a processor capable of creating a binding using identification information of the user equipment and maintaining an application profile that includes an identification of an access technology used in providing radio communication to the user equipment, wherein the processor is capable of detecting when the user equipment is connected to a plurality of different access technologies simultaneously by checking the bindings and corresponding application profiles and determining whether to handover a specific data flow from a first access technology to a second access technology when the user equipment is connected to a plurality of access technologies simultaneously.

In certain embodiments, a process for handing over a data flow is presented that includes receiving at an anchor gateway a first binding registration including an identification of a user equipment (UE), creating a binding at the anchor gateway using the identification for the UE and maintaining an application profile that includes information regarding a first access technology used in the connection, sending from the anchor gateway a first data flow and a second data flow towards the UE, where the first access technology is used to communicate between the UE and the anchor gateway, receiving at the anchor gateway a second binding registration for the UE, creating a second binding at the anchor gateway using the identification for the UE and associating a corresponding application profile that includes a second access technology, determining whether to handover a specific data flow from the first access technology to the second access technology, and once a determination is made to handover the specific data flow, forwarding the first data flow to the UE over the second access technology while sending to the UE the second data flow over the first access technology.

In yet other embodiments, a mobile device that can communicate with a plurality of radio access networks using a plurality of access technologies is presented where the mobile device attaches to a first radio access network of a first access technology to cause the mobile device to transmit and receive a first data flow and a second data flow over the first access technology between the mobile device and the first radio access network, and in response to roaming to an area serviced by a second radio access network of a second access technology in addition to the first access technology, attaches to the second radio access network such that the second data flow is provided over the second access technology between the mobile device and the second radio access network, while the first data flow continues to be over the first access technology.

DETAILED DESCRIPTION OF THE DISCLOSURE

Figure 1:
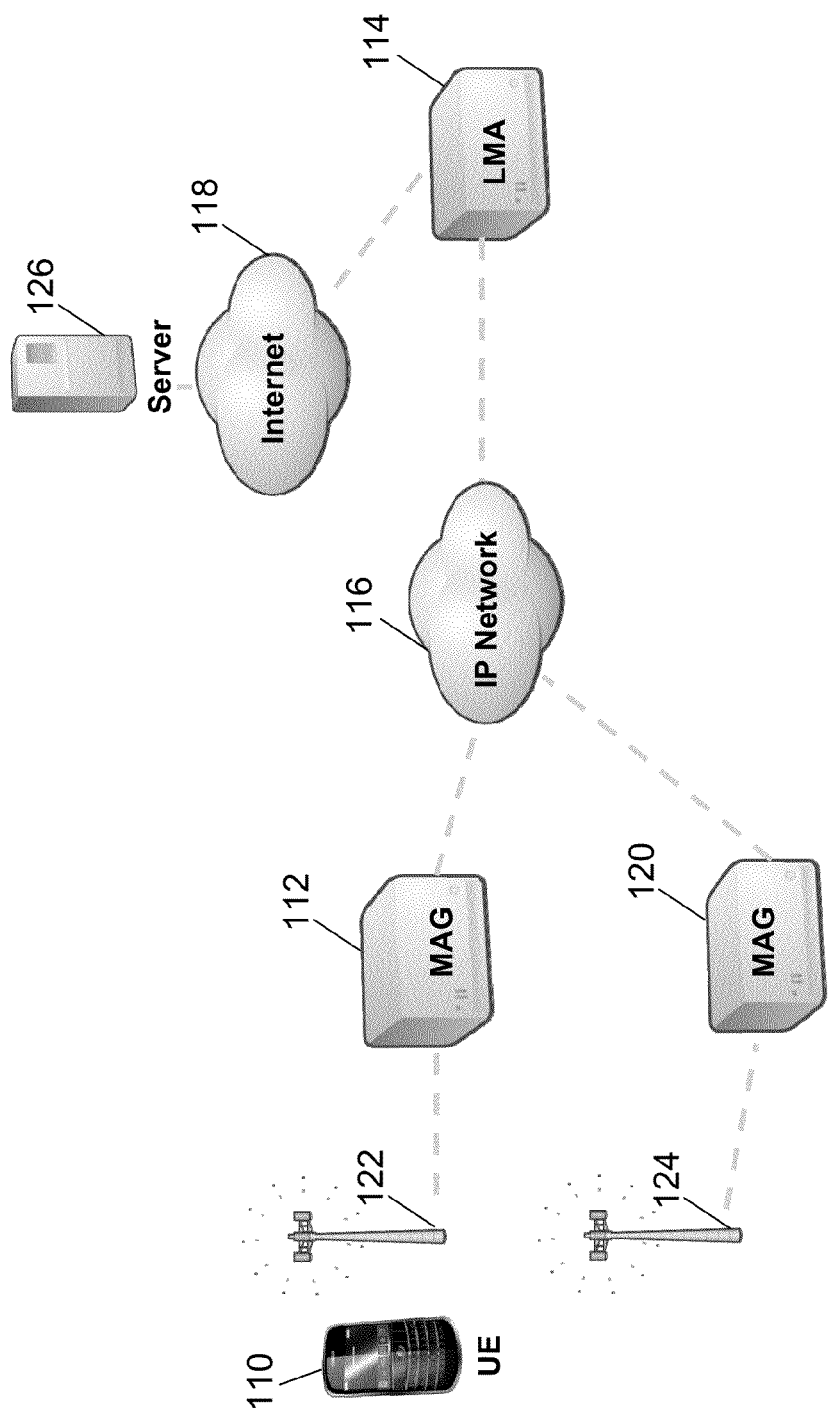
FIG. 1 illustrates a wireless network diagram in accordance with some embodiments.

Methods and systems are disclosed that provide flow balancing for multiple access technologies in a communication network. As wireless communication networks evolve towards the fourth generation (4G) of wireless communications technology and as other technologies are being developed, there are more ways and more access technologies that a mobile device can use to connect to the network. Mobile devices can be equipped with multiple wireless access technologies that enable the mobile devices to simultaneously connect to different wireless radio access networks that utilize different access technologies. An example of this is a mobile device, also generically referred to here as user equipment (UE), which connects to the network using long term evolution (LTE) and WiFi wireless access technologies simultaneously. This flexibility can be useful, for example, to make a voice phone call using the LTE network, which can guarantee a certain level of service, while also downloading an application to the mobile device using WiFi.

In addition to being able to support communication with user equipment using multiple access technologies, a gateway device can be used to manage data flows, such as IP packet flows, among the access technologies. A mobile device that has the ability to utilize multiple access technologies and/or multiple IP addresses at the same time can be considered a multi-homed mobile device. With such multi-homed mobile devices, it is beneficial to be able to manage the flow of data over the various wireless access technologies. This management can include distributing the data (such as application traffic) according to the intrinsic properties of the applications providing the data. For example, a voice application running on a voice over internet protocol (VoIP) performs better on an LTE wireless access connection that offers Quality of Service (QoS) than on a WiFi connection lacking QoS. Certain applications, such as web browsing, can perform nearly as well on a WiFi connection or an LTE connection. These differences between and among applications can be used to determine how flows from the applications are routed among the available wireless access technologies. The management of the multiple connections can provide the user of mobile device with a better experience, while allowing the network operator to preserve and distribute capacity on the wireless access technologies.

In some embodiments, applications that send and receive data are assigned a priority to wireless access technologies. The priority can be assigned according to the attributes of the wireless access technology with the data flows from applications being balanced across the available wireless access technologies. The prioritizing of applications to wireless access technologies can be configurable based on network operator policies. A combination of policy determinations and capacity considerations can also be used when a mobile device requests a specific network connection for an application. In other embodiments, the user can initiate or select certain operations or applications to use specific access technologies. For example, the user can select the user equipment to download content (e.g., movies, games, songs, etc.) when the device is connected to a WiFi access point, but not when connected to the LTE macro radio access network. In this way, when the user roams into the range of a WiFi connection, the mobile device or gateway device can setup a session with the network to begin using the WiFi connection. The user can also setup rules and polices governing the use of the various access technologies.

In order to manage the policies of the user and/or the network operator, a logic can be implemented in a gateway device. This logic can be used to prioritize applications and control the setup and redirection of data flows to according to the polices and rules. In some embodiments, the user preferences can be linked to the subscriber information stored by the network operator for the user. When a user connects to the network, the subscriber information can be sent to the gateway device. In the gateway, information can be collected regarding the data flows initiated by the user as well as the connections maintained by the user equipment. The information regarding the data flows can be collected through inspection of the data, which may be accomplished by deep packet inspection. As information is obtained, it can be added to a database or other structure in the gateway. The logic can map the information and analyze the information against rules and policies specific to the subscriber to make decisions regarding how the data flow are routed to the user equipment. For example, if a user is talking on a mobile device using VoIP on a WiFi connection and the user comes in range of a LTE connection, the access gateway can switch the VoIP application flow to the LTE connection which can provide better performance.

Other features can also be provided by the gateway device. For example, network operators can offer users different pricing plans depending on which available access technologies are used, and whether the user offloads data flows to other networks. For example, a WiFi access network can be cheaper for a network operator because it does not use the network operator's air link bandwidth, which is limited and expensive. Also, in QoS based access technologies, applications using more than the allowed QoS at a given time can be switched to another access technology rather than the connection being terminated.

FIG. 1 illustrates a communication network with a mobile device in accordance with certain embodiments. The communication network includes user equipment 110, mobility access gateway (MAG) 112, local mobility anchor gateway (LMA) 114, IP Network 116, Internet 118, MAG 120, radio access network 1 (RAN-1) 122, radio access network 2 (RAN-2) 124, and server 126. In operation, the MAG can perform the functions of a mobility management function, such as managing the mobility related signaling for a mobile device that is attached to it, track the mobile device's movements, and signal the mobile device's LMA. The LMA provides a topological anchor point for the mobile device and can manage the mobile device's binding state. The LMA can function like a home agent for the mobile device in embodiments using either Mobile IP (MIP) or Proxy Mobile IP (PMIP). In some embodiments, the gateway device can use protocols such as proxy mobile internet protocol (PMIPv6), internet protocol (IPv6), IPv4, PMIPv4, or any other applicable protocol for communication with the user equipment.

Figure 2B:
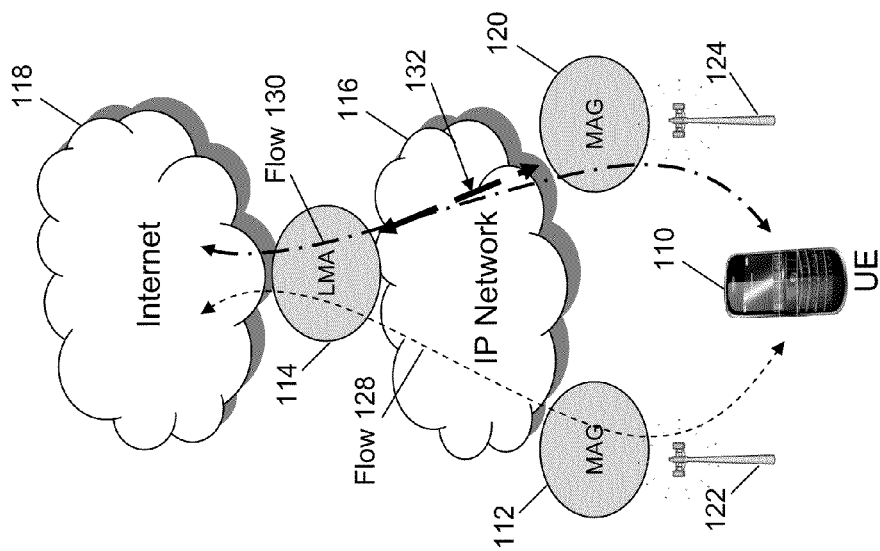
FIG. 2B illustrates a block diagram of a mobile devices attachment after a packet flow handover in accordance with some embodiments.
Figure 2A:
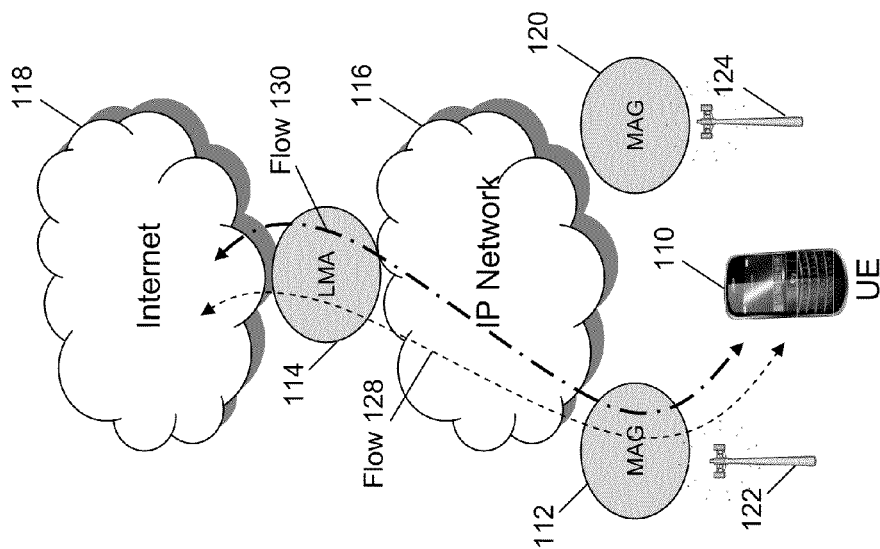
FIG. 2A illustrates a network diagram of a mobile device with multiple packet flows in accordance with some embodiments.

FIG. 2A illustrates a communication network before a handover of a flow in accordance with certain embodiments. As shown in FIG. 2A, UE 110 is communicating with the internet 118 through MAG 112 and LMA 114 using two data flows, flow 128 and 130. The data flow can be packet data sent in an Internet Protocol (IP) and can be generated/requested by an application running on UE 110. For example, the subscriber can be browsing the web on UE 110 and the web browser can be sending and receiving data that is represented as flow 128. At the same time, an email application, can be periodically be checking with servers to determine if any new mail has been received and this can be flow 130. The flows could also represent a voice over IP (VoIP) conversation and the downloading of content such as video content for later watching for example. When UE 110 roams into coverage of RAN 124, the UE 110 can attach to that network as well. The UE 110 is now able to communicate with the Internet 118 using two different access technologies because RAN 122 and RAN 124 can be network equipment for different access technologies. Once this occurs the LMA 114 can detect the second attachment and trigger a transfer of a flow to proceed over the RAN 124.

FIG. 2B illustrates a communication network after a handover of a flow in accordance with certain embodiments. The trigger can be a result of the network operator policies, the subscriber's preferences, or a combination of the two. Once a decision is made to offload traffic onto RAN 124, LMA 114 exchanges flow handover messages with MAG 120 to prepare for the handover. LMA 114 can then begin forwarding the selected data flows over RAN 124, which can be a WiFi access point. If the UE 110 moves outside the range of one of the access technologies, this can be detected, and the data flows can be shifted, in accordance with the policies on the LMA 114, to another access technology. For example, if the UE 110 moves outside the range of RAN 124, data flow 130 can be shifted to RAN 122. In the alternative, the data flow can be terminated or shifted to a third access technology.

Figure 3:
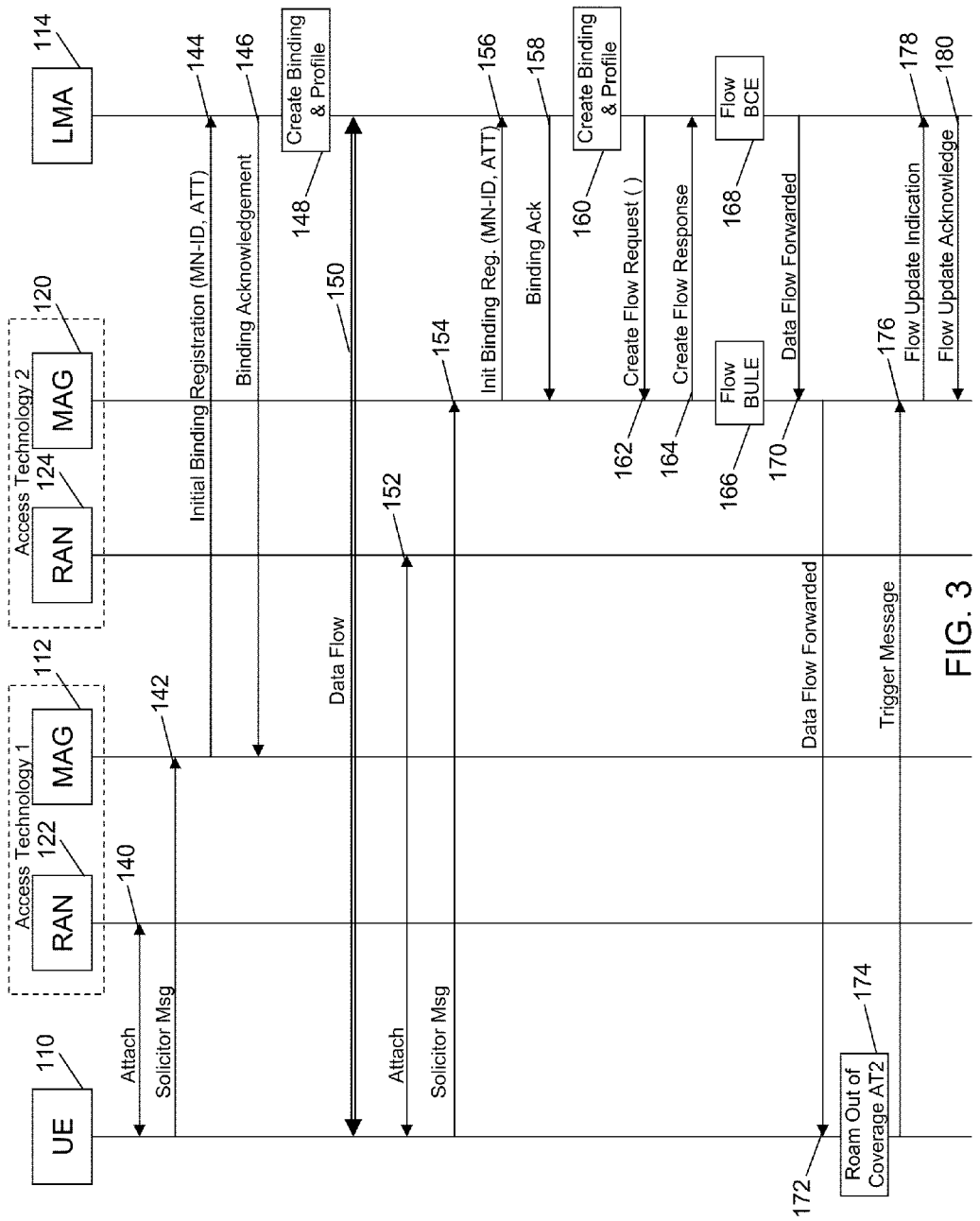
FIG. 3 illustrates messaging for a handover of a data from a first access technology to a second access technology in accordance with some embodiments.

FIG. 3 illustrates messaging for the handover of a data flow in accordance with certain embodiments. In messaging 140, before any communication through a particular MAG begins, the UE 110 attaches to RAN 122 using an access technology. The access technology can be an LTE-based technology. A solicitor message 142 is sent to MAG 112 by UE 110 to initiate a network connection. In messaging 144, MAG 112 performs an initial binding registration with LMA 114. The message 144 can provide LMA 114 with an identification of the UE 110 (e.g., MN-ID) and the access technology type (e.g., ATT ID). The MAG 112 sends a binding acknowledgement message 146 to indicate a binding is being created. In step 148, LMA 114 creates a binding for UE 110 using the UE's identification (e.g., MN-ID). LMA 114 also checks an application profile that the LMA maintains for each wireless access technology. The application profile specifies a priority ordering of applications suited for a particular wireless access technology. The application profile can be based on local policies and is configurable. The LMA 114 associates the corresponding application profile with the wireless access technology identification (e.g., ATT ID). The association can be a mapping through the use of pointers or addresses or the creation of entries in a database or structure. The binding and the application profile can be maintained in a cache, a computer readable medium, or any other type of storage. In some embodiments, associations or sessions can be used in addition to or in place of bindings.

The UE 110 begins sending and receiving data in data flow 150 after the binding is setup in LMA 114. Data flow 150 illustrates two separate data flows. These two data flows can be from two applications. The individual applications can be VoIP and web browsing. When the application data flows 150 initiate through RAN 122, a flow state is established in MAG 112 and LMA 114 for the individual application data flows. The flow state can be stored with the application profile or be associated with binding, so that MAG 114 can later determine the status of the various data flows from UE 110. While data flows 150 are being sent through RAN 122, UE 110 detects and attaches to RAN 124 using a second wireless access technology while still attached to RAN 122. The attachment can be performed in messaging 152.

Upon attachment to RAN 124, UE 110 can send a solicitor message 154 to MAG 120 to establish a connection to the network. MAG 120 sends an initial binding registration message 156 to the LMA 114 and provides LMA 114 with an identification of the UE and of the access technology type. LMA 114 sends a binding acknowledgement message 158 and establishes a new binding for UE 110 in step 160. The binding can use the UE's identification information and associate the access technology type with an application profile. Based on the application profiles, the LMA 114 determines whether to shift any data flows to a different wireless access technology. The determination can be made using a logic in the LMA that uses rules and policies to determine how data flows are to be routed. In some embodiments, capacity information can also be used in determining how to shift data flows. For example, subscriber usage statistics for application data flows can be used in determining how to shift data flows along with priority information.

If LMA 114 shifts a data flow, the LMA sends a create flow request message 162 to the MAG 120. Create flow request message 162 includes the UE identification information such as a MN-ID, addressing information such as an IPv6 HNP/IPv4-HoA, and flow parameters related to the data flow such as state information. The MAG 120 responds to the create flow request message 162 with a create flow response message 164. The successful exchange of the create flow messages between LMA 114 and MAG 120, results in the creation of a Flow BCE (binding cache entry) 168 at LMA 114 and a Flow BULE (binding update list entry) 166 at MAG 120. The Flow BCE 168 and the Flow BULE 166 are specific to a flow and are identified by the flow parameters. A flow BCE overrides a normal BCE (binding cache entry) for forwarding purposes at the LMA, and the flow BULE overrides a normal BULE (binding update list entry) at the MAG. The flow parameters can describe the data flow and be used to determine which packets belong to a particular data flow. The flow parameters can include information regarding the origination of the flow, identification information of the flow, the data content in the flow, or any other identifying information that can be used to classify a data packet as being part of a flow.

Once the flow BCE 166 is established, LMA 114 forwards packets conforming to the flow parameters to MAG 120, and MAG 120 then sends the packets to UE 110, as shown in flows 170 and 172. MAG 120 may inform the UE 110 of the flow handover to access technology 2/RAN 124 by sending access technology specific messaging. Some access technologies, such as WiFi, do not have dedicated bearer establishment. In such networks, the MAG can act as a default router and send an extended "redirect" message to the UE informing it to use the MAG as its default router for the identified flow.

If the UE moves out of the coverage of access technology 2 and RAN 124 in 174, MAG 120 may detect the UE moving out of coverage based on access technology specific triggers such as trigger message 176. MAG 120 can then send a flow update indication message 178 informing LMA 114 of the loss of coverage. The LMA responds to the flow update indication message 178 with a flow update acknowledge message 180 and reverts to using the normal BCE for forwarding purposes. This reversion to the normal BCE means that the data flow will be routed to access technology 1 through RAN 122. The data flow can also be routed using any other suitable access technology or can drop the data flow. The data flow can be discontinued, for example, if the rules of the logic determine that the subscriber does not have the plan to support sending this type of data over the applicable access technology or if the subscriber has opted not to receive data on the applicable access technology.

In some embodiments, the UE can initiate movement of one or more of its flows by sending a request to the MAG to which the flow will be changed. This MAG, as described above, sends a create flow request to the LMA and the LMA responds with a create flow response so the flow BCE and flow BULE can be established and the flow moved to the target network. The UE can use access technology specific signaling to indicate a preference to use a particular access technology or network for one or more of its flows. For example, in LTE, a request bearer resource allocation message can be used.

Figure 4:
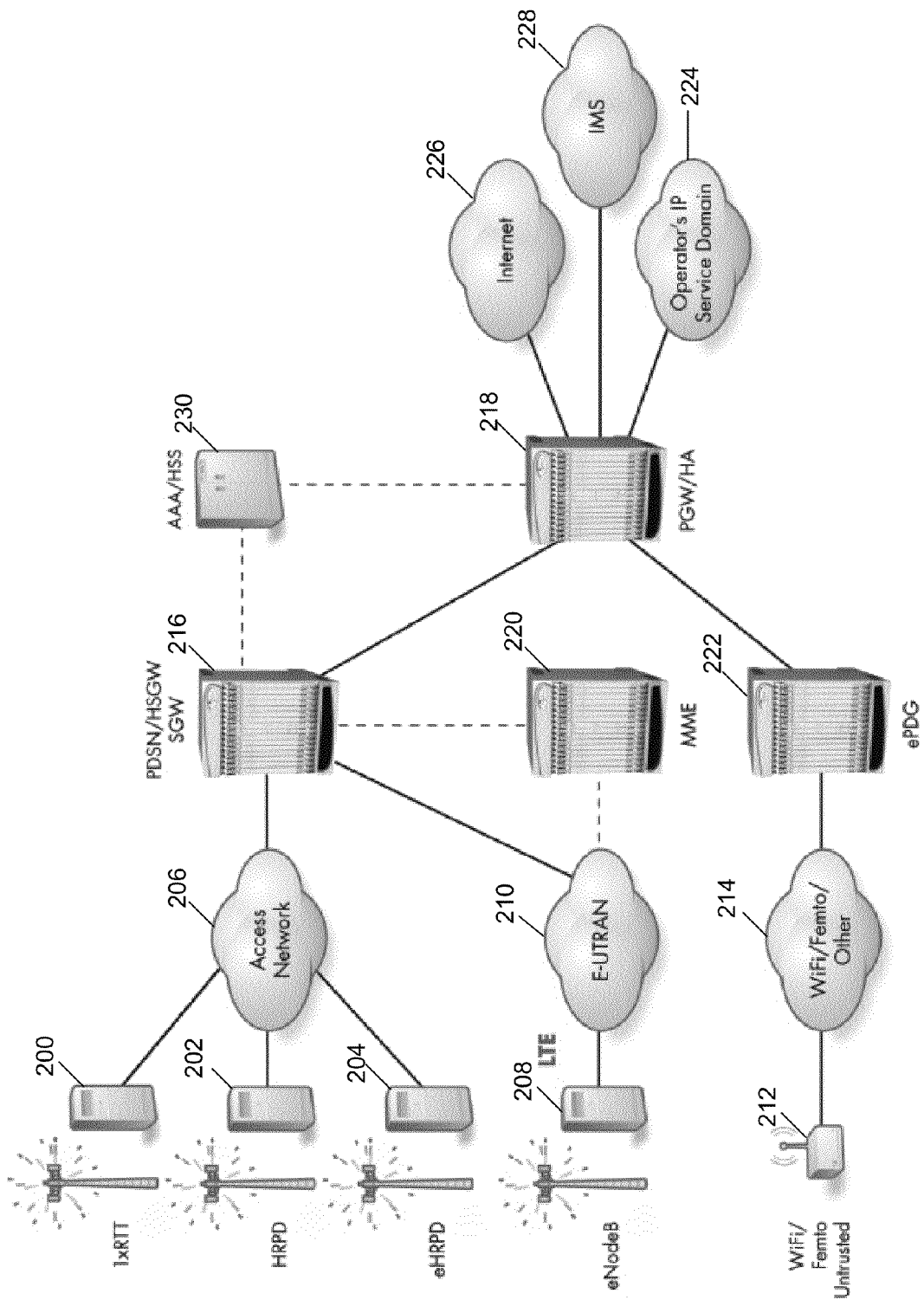
FIGS. 4-5 illustrate communication networks including a long term evolution (LTE) topology in accordance with some embodiments.
Figure 5:
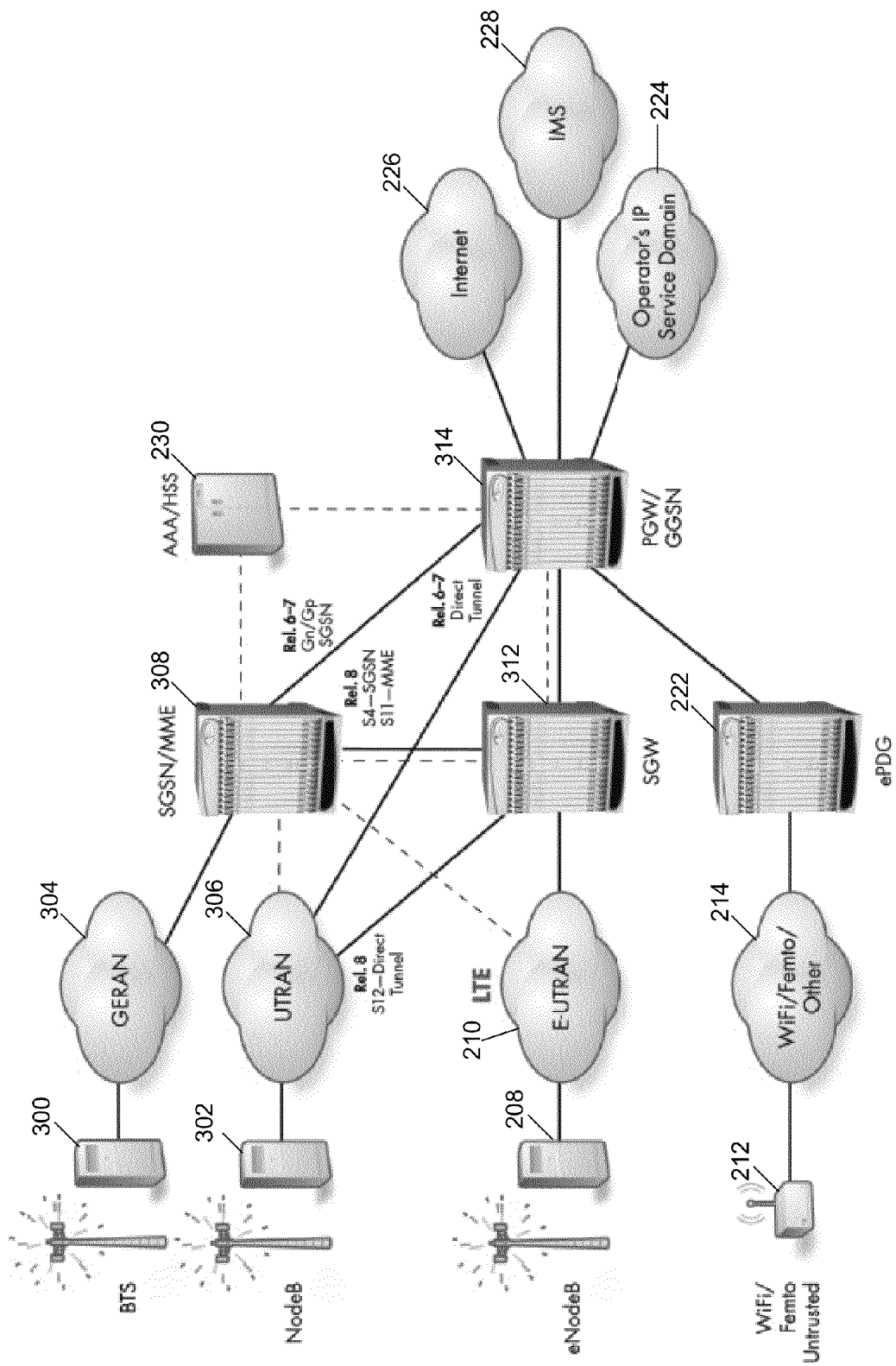
Figure 6:
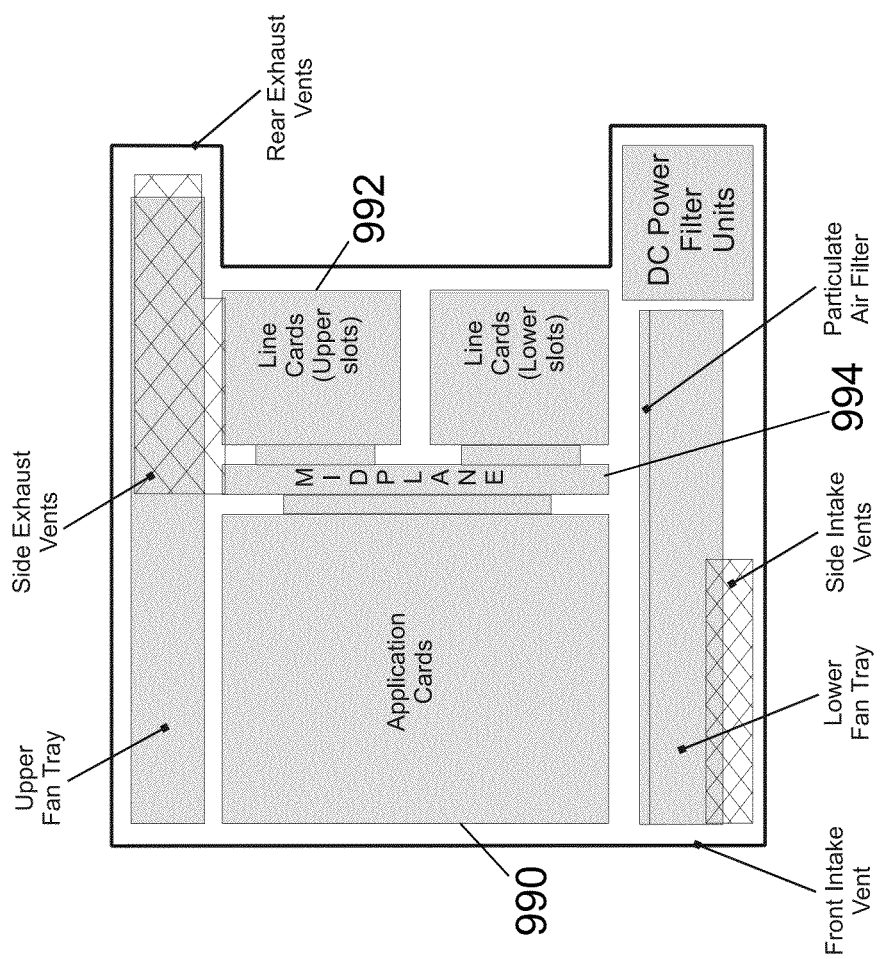
FIG. 6 illustrates components of a gateway in accordance with some embodiments.

FIG. 4 illustrates a communication network that includes handovers between access technologies in accordance with certain embodiments. FIG. 4 includes a number of radio access technologies such as a 1xRTT transceiver 200, a high-rate packet data (HRPD) transceiver 202, and an evolved high-rate packet data (eHRPD) transceiver 204, each of which can connect to an access network 206. An evolved Node B (eNodeB) transceiver 208 is an LTE network radio network component that connects to an Evolved UMTS Terrestrial Radio Access Network (E-UTRAN) 210. Other radio access technologies such as WiFi, Femto, WiMAX, or any other radio spectrum technology can use transceiver 212 to connect to the network using a broadband or other access network.

The access network 206 can communicate with an access gateway 216 that implements a combination of functionalities such as a packet data serving node (PDSN), a HRPD serving gateway (HSGW), and a serving gateway (SGW). In operation, the PDSN functionality can be used with 1xRTT 200, the HSGW functionality can be used with HRPD 202 and eHRPD 204, and the SGW functionality can be used with the eNodeB 208. The access gateway 216 can communicate with an anchor gateway 218 which can implement a packet data network gateway (PGW) and a Home Agent (HA) and a mobility management entity (MME) 220. On the access network side, the anchor gateway 218 can also communicate with an evolved packet data gateway (ePDG) 222 which provides connectivity to the WiFi/Femto/other transceiver 212. On the packet core side, the anchor gateway can communicate with the operator's IP service domain 224, the internet 226, and IP multimedia subsystem (IMS) 228. An authentication, authorization, and accounting (AAA) server/home subscriber server (HSS) 230 can communicate with the access gateway 216, the anchor gateway 218, or both.

The Home Subscriber Server (HSS) can be a master user database that supports IMS network entities that handle calls. The HSS stores subscription-related information (subscriber profiles), performs authentication and authorization of the user, and can provide information about the subscriber's location and IP information. The AAA server can provide authentication, access control, and accounting to the network. The authentication can involve verification of the subscriber, the access control can involve granting or denying access to specific services, and the accounting that can take place is the tracking of the use of network resources by subscribers. Other servers, such as the Home Location Register (HLR) can be used in other embodiments. In certain embodiments, the AAA/HSS 230 can communicate with the access gateway 216 for charging purposes.

The LTE communication network includes a PDN gateway (PGW), a serving gateway (SGW), an E-UTRAN (evolved-UMTS terrestrial radio access network), and a mobility management entity (MME). The SGW sits in the user plane where it forwards and routes packets to and from the eNodeB and Packet Data Network Gateway (PGW). The SGW also serves as the local mobility anchor for inter-eNodeB handover and mobility between 3GPP networks. The PGW acts as the interface between the LTE network and other packet data networks, such as the Internet or SIP-based IMS networks (fixed and mobile). The PGW serves as the anchor point for intra-3GPP network mobility, as well as mobility between 3GPP and non-3GPP networks. The PGW acts as the Policy and Charging Enforcement Function (PCEF), which manages Quality of Service (QoS), online/offline flow-based charging data generation, deep-packet inspection, and lawful intercept.

In LTE, the MAG function can be implemented in access gateway 216, which also implements the Serving Gateway (SGW). The LMA can be implemented in the anchor gateway 218 or the MME 220, depending on the embodiment. In some embodiments, the access gateway 216 and the anchor gateway 218 can be combined on the same gateway. The MME 220 may also be combined with the access gateway 216 and/or the anchor gateway 218. In operation, after a data flow handover has occurred, a create dedicated bearer request message can be sent to inform MME 220 of the handover event from SGW 216. MME 220 informs eNodeB 208 with a bearer set up request message, and the eNodeB 208 informs the UE with a RRC connection reconfiguration message.

The ePDG 222 is responsible for interworking between the EPC and fixed non-3GPP access technologies such as a WiFi, WiMAX, LTE metro, and femtocell access networks. In some embodiments, the flow balancing can be performed with a UE that is simultaneously connected to a WiFi network and an LTE network. As described above, the handing over of data flows can be prompted by a simultaneous connection through different access technologies as well as a determination by a logic after processing rules and policies that a handover should occur. The policies may encourage offloading data to ePDG 222 to UE through transceiver 212 because it uses fewer network resources and is therefore desirable. The logic can also be used to transfer all of the data flows to UE when the UE is connected to a femto access point and the LTE macro network at the same time. The logic and bindings described herein can be used to solve handover issues between femto and macro networks.

The ePDG 222 can use IPSec/IKEv2 to provide secure access to the EPC network. Optionally, the ePDG can use Proxy Mobile IPv6 (PMIPv6) to interact with the Packet Data Network Gateway (PGW) when the mobile subscriber is roaming in an untrusted non-3GPP system. The ePDG is involved in tunnel authentication and authorization, transport level packet marking in the uplink, policy enforcement of Quality of Service (QoS) based on information received via Authorization, Authentication, Accounting (AAA) infrastructure, lawful interception, and other functions.

The MME resides in the EPC control plane and manages session states, authentication, paging, mobility with 3GPP 2G/3G nodes, roaming, and other bearer management functions. The MME can be a standalone element or integrated with other EPC elements, including the Serving Gateway (SGW), Packet Data Network Gateway (PGW), and Release 8 Serving GPRS Support Node (SGSN). The MME can also be integrated with 2G/3G elements, such as the Serving GPRS Support Node (SGSN) and Gateway GPRS Support Node (GGSN). This integration is the key to mobility and session management interworking between 2G/3G and 4G mobile networks.

FIG. 4 illustrates a communication network that implements the flow balancer with legacy universal mobile telecommunications systems (UMTS) network components in accordance with certain embodiments. The legacy transceivers include base transceiver station (BTS) 300 and NodeB transceiver 302. The BTS 300 can communicate with a GSM EDGE Radio Access Network (GERAN) 304 and the NodeB 302 can communicate with a UMTS terrestrial radio access network (UTRAN) 306. The serving GPRS support node (SGSN) can be implemented on a gateway 308 with a mobility management entity (MME). The GERAN 304 can communicate through the SGSN functionality on gateway 308 to serving gateway (SGW) 312 or gateway GPRS support node (GGSN)/PWG 314. In some embodiments either SGSN 308 or SGW 312 can be the access gateway where the MAG function is implemented and PGW 314 can be the anchor gateway where the LMA function is implemented.

The flow balancer and its corresponding logic can be implemented as a software or hardware based solution, or a combination of hardware and software. For logic implemented in software, it is stored in a computer readable medium, such as a memory or storage device, and executed by a processor. The logic can include other aspects such a database linking other user information to the accounting information. Other embodiments are possible where a different LMA is used for different wireless access technologies. Also the create flow messaging along with the flow BCE and flow BULE can be used at any time, based on the logic implemented in hardware or software in the LMA. The logic can be used to improve the customer experience and the operator manageability of packet traffic on the networks.

The mobile device or user equipment described above can communicate with a plurality of radio access networks using a plurality of access technologies. The mobile device can be a smartphone offering advanced capabilities such as word processing, web browsing, gaming, e-book capabilities, an operating system, and a full keyboard. Operating systems that can be used on the mobile device include Symbian OS, iPhone OS, RIM's BlackBerry, Windows Mobile, Linux, Palm WebOS and Android. The screen may be a touch screen that can be used to input data to the mobile device and the screen can be used instead of the full keyboard.

The mobile device can include one or more antennas that are configured to transmit and receive data on a radio frequency with a plurality of radio access networks and/or access technologies. The one or more antennas can be used to send and receive data flows over a plurality of access technologies. For example, the at least one antenna can receive the first data flow and the second data flow on a first access technology, and also receive the first data flow on the first access technology and the second data flow on the second access technology at the same time. The mobile device can be configured with one or more processors that process instructions to modulate data on a first access technology and a second access technology and to process a first data flow and a second data flow received from the at least one antenna. The processors can also communicate with a computer readable medium used for storage such as programmable read only memory. The processor can be any applicable processor such as a system-on-a-chip that combines a CPU, an application processor, and flash memory. The processor can also be used in combination with the antenna to attach to a first and a second access technology simultaneously and to receive a data flow from a first access technology and a data flow from a second access technology at the same time. The processor can also compile user preferences regarding how certain types of data flows are transmitted to the mobile device and communicate these preferences to the network, such as the access gateway.

The access gateway and anchor gateway described above can be implemented on a gateway. The gateway can perform multiple and different integrated functionalities. In some embodiments, a packet data network gateway (PGW), a serving gateway (SGW), Gateway General packet radio service Support Node (GGSN), a serving GPRS support node (SGSN), a packet data serving node (PDSN), a foreign agent (FA), or home agent (HA) can be implemented on a gateway. Other types of functionalities can also be implemented on a gateway in other embodiments are a packet data inter-working function (PDIF), an access service network gateway (AS-NGW), a base station, a access network, a User Plane Entity (UPE), an IP Gateway, an mobility management entity (MME), a packet data network gateway (PGW), a serving gateway (SGW), a session initiation protocol (SIP) server, a proxy-call session control function (P-CSCF), and an interrogating-call session control function (I-CSCF). In certain embodiments, one or more of the above-mentioned other types of functionalities are integrated together or provided by the same gateway.

The gateway can also support sessions originated from a Femto base station, which would connect to the gateway using a broadband network. A person or corporation may use a Femto base station in a home or business to support one or more mobile nodes. The gateway can provide trigger based traffic management during a handoff from a Femto base station to a macro base station, while maintaining traffic management for the mobile node. In certain embodiments, a gateway device is provided by Starent Networks, Corp. of Tewksbury, Mass. on an ST16 or ST40 multimedia platform.

FIG. 10 illustrates positioning of cards in the gateway chassis in accordance with some embodiments. The gateway device can include slots for loading application cards 990 and line cards 992. A midplane 994 can be used in the gateway device to provide intra-gateway communications, power connections, and transport paths between the various installed cards. The midplane 994 can include buses such as a switch fabric, a control bus, a system management bus, a redundancy bus, and a time division multiplex (TDM) bus. The switch fabric is an IP-based transport path for user data throughout the gateway device implemented by establishing inter-card communications between application cards and line cards. The control bus interconnects the control and management processors within the gateway device. The gateway device management bus provides management of system functions such as supplying power, monitoring temperatures, board status, data path errors, card resets, and other failover features. The redundancy bus provides transportation of user data and redundancy links in the event of hardware failures. The TDM bus provides support for voice services on the system.

The gateway device supports at least two types of application cards: a switch processor card and a packet accelerator card. The switch processor card serves as a controller of the gateway device and is responsible for such things as initializing the gateway device and loading software configurations onto other cards in the gateway device. The packet accelerator card provides packet processing and forwarding capabilities. Each packet accelerator card is capable of supporting multiple contexts. Hardware engines can be deployed with the card to support parallel distributed processing for compression, classification traffic scheduling, forwarding, packet filtering, and statistics compilations.

The packet accelerator card performs packet-processing operations through the use of control processors and a network processing unit (NPU). The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing. The line cards when loaded in the gateway device provide input/output connectivity and can also provide redundancy connections as well.

In some embodiments, a ST40 embodiment of the gateway device can support a system management card (SMC) and a packet services card (PSC). The system management card is a system control and management card for managing and controlling other cards in the gateway device. The packet services card is a high-speed processing card that provides multi-threaded point-to-point, packet data processing, and context processing capabilities, among other things.

The operating system software can be based on a Linux software kernel and run specific applications in the gateway device such as monitoring tasks and providing protocol stacks. The software allows gateway resources to be allocated separately for control and data paths. For example, certain packet accelerator cards can be dedicated to performing routing or security control functions, while other packet accelerator cards are dedicated to processing user session traffic. As network requirements change, hardware resources can be dynamically deployed to meet the requirements in some embodiments. The system can be virtualized to support multiple logical instances of services, such as technology functions (e.g., a PDSN, ASNGW, PDIF, HA, GGSN, HSGW, or IPSG).

The gateway device's software can be divided into a series of tasks that perform specific functions. These tasks communicate with each other as needed to share control and data information throughout the gateway device. A task is a software process that performs a specific function related to system control or session processing. Three types of tasks operate within the gateway device in some embodiments: critical tasks, controller tasks, and manager tasks. The critical tasks control functions that relate to the gateway's ability to process calls such as gateway initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a gateway device include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the gateway device by monitoring the various software and hardware components of the gateway device. Recovery control task subsystem is responsible for executing a recovery action for failures that occur in the gateway device and receives recovery actions from the high availability task subsystem. Shared configuration task subsystem provides the gateway device with an ability to set, retrieve, and receive notification of gateway configuration parameter changes and is responsible for storing configuration data for the applications running within the gateway device. Resource management subsystem is responsible for assigning resources (e.g., processor and memory capabilities) to tasks and for monitoring the task's use of the resources.

Virtual private network (VPN) subsystem manages the administrative and operational aspects of VPN-related entities in the gateway, which include creating separate VPN contexts, starting IP services within a VPN context, managing IP pools and subscriber IP addresses, and distributing the IP flow information within a VPN context. In some embodiments, within the gateway device, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards. The session subsystem is responsible for processing and monitoring a mobile subscriber's data flows in some embodiments. Session processing tasks for mobile data communications include: A10/A11 termination for CDMA networks, GSM tunneling protocol termination for GPRS and/or UMTS networks, asynchronous PPP processing, packet filtering, packet scheduling, Diffserv codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In some embodiments, the software needed for implementing a process or a database includes a high level procedural or an object-orientated language such as C, C++, C#, Java, or Perl. The software may also be implemented in assembly language if desired. Packet processing implemented in a gateway device can include any processing determined by the context. For example, packet processing may involve high-level data link control (HDLC) framing, header compression, and/or encryption. In certain embodiments, the software is stored on a computer readable medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document.

Other embodiments are within the following claims. For example, the mobility access gateway function could be combined with or co-located with an access gateway.

We claim:

1. A gateway that implements a local mobility anchor comprising:
   a first network connection configured to send and receive data flows from a packet network;
   a second network connection configured to send and receive data flows from a user equipment; and
   a processor configured to create a binding that includes identification information of the user equipment and an access technology type that is used to establish a data flow and maintaining an application profile that includes an identification of an access technology used in providing radio communication to the user equipment and preferences regarding which applications are suited for that access technology, wherein the preferences are determined based on a priority ordering of applications suited for a particular wireless access technology,
   wherein the processor is configured to detect when the user equipment is connected to a plurality of different access technologies simultaneously by checking the bindings and corresponding application profiles and determining whether to initiate a handover of a specific data flow from a first access technology to a second access technology, based on the bindings and corresponding application profiles when the user equipment is connected to a plurality of access technologies simultaneously, wherein the first access technology is of a different type than the second access technology, and when a handover of the specific data flow is initiated, forwarding the specific data flow over the second access technology while sending to the UE another data flow over the first access technology.

2. The gateway of claim 1, wherein the first access technology is a long-term evolution based radio access technology and the second access technology is WiFi.

3. The gateway of claim 1, wherein the processor is configured to create a binding cache entry to forward a specific data flow to the UE through the second access technology.

4. The gateway of claim 3, wherein the processor is configured to remove the binding cache entry when the UE roams out of coverage of the second access technology.

5. The gateway of claim 1, wherein the application profiles specify a priority ordering of applications suited for a particular wireless technology.

6. The gateway of claim 1, wherein the application profiles are based on policies local to the gateway and are configurable.

7. A method of handing over a data flow comprising:
   receiving at an anchor gateway a first binding registration including an identification of a user equipment (UE);
   creating a binding at the anchor gateway that includes the identification information of the UE and an access technology type that is used to establish a data flow and maintaining an application profile that includes an identification of a first access technology used in providing radio communication to the UE and preferences regarding which applications are suited for that access technology, wherein the preferences are determined based on a priority ordering of applications suited for a particular wireless access technology,
   sending from the anchor gateway a first data flow and a second data flow towards the UE, where the first access technology is used to communicate between the UE and the anchor gateway;
   receiving at the anchor gateway a second binding registration for the UE;
   creating a second binding at the anchor gateway using the identification information of the UE and maintaining a corresponding application profile that includes an identification of a second access technology used in providing radio communication to the UE that includes preferences amongst a plurality of applications;
   determining whether to initiate a handover of a specific data flow from the first access technology to the second access technology, based on the bindings and corresponding application profiles, wherein the first access technology is of a different type than the second access technology;
   initiating a handover of the specific data flow from the first access technology to the second access technology; and
   once a handover of the specific data flow is initiated, forwarding the first data flow to the UE over the second access technology while sending to the UE the second data flow over the first access technology.

8. The method of claim 7, further comprising:
   removing the forwarding of the first data flow over the second access technology; and sending the first data flow over the first access technology.

9. The method of claim 8, wherein the removing is a removal of a binding cache entry at the anchor gateway when the UE roams out of coverage of the second access technology.

10. The method of claim 7, wherein the first access technology is a long-term evolution (LTE) based radio access technology and the second access technology is WiFi.

11. The method of claim 7, wherein the binding is a proxy mobile internet protocol version 6 (PMIPv6) binding.

12. The method of claim 7, wherein the application profiles specify a priority ordering of applications suited for a particular wireless technology.

13. The method of claim 7, wherein the application profiles are based on policies local to the gateway and are configurable.

14. A computer program product comprising software encoded on one or more non-transitory computer-readable media and when executed on an anchor gateway operable to:
receive at an anchor gateway a first binding registration including an identification of a user equipment (UE);
create a binding at the anchor gateway that includes the identification information of the UE and an access technology type that is used to establish a data flow and maintaining an application profile that includes an identification of a first access technology used in providing radio communication to the UE and preferences regarding which applications are suited for that access technology, wherein the preferences are determined based on a priority ordering of applications suited for a particular wireless access technology;
send from the anchor gateway a first data flow and a second data flow towards the UE, where the first access technology is used to communicate between the UE and the anchor gateway;
receive at the anchor gateway a second binding registration for the UE;
create a second binding at the anchor gateway using the identification information of the UE and maintaining a corresponding application profile that includes an identification of a second access technology used in providing radio communication to the UE that includes preferences amongst a plurality of applications;
determine whether to initiate a handover of a specific data flow from the first access technology to the second access technology, based on the bindings and corresponding application profiles, wherein the first access technology is of a different type than the second access technology;
initiate a handover of the specific data flow from the first access technology to the second access technology; and
once a handover of the specific data flow is initiated, forwarding the first data flow to the UE over the second access technology while sending to the UE the second data flow over the first access technology.

15. The computer program product of claim 14, further comprising software operable to:
remove the forwarding of the first data flow over the second access technology; and sending the first data flow over the first access technology.

16. The computer program product of claim 15, wherein the software operable to remove the forwarding of the first data flow over the second access technology removes a binding cache entry at the anchor gateway when the UE roams out of coverage of the second access technology.

17. The computer program product of claim 14, wherein the first access technology is a long-term evolution (LTE) based radio access technology and the second access technology is WiFi.

18. The computer program product of claim 14, wherein the binding is a proxy mobile internet protocol version 6 (PMIPv6) binding.

19. The computer program product of claim 14, wherein the application profiles specify a priority ordering of applications suited for a particular wireless technology.

20. The computer program product of claim 14, wherein the application profiles are based on policies local to the gateway and are configurable.

* * * * *